(12) United States Patent
Woo (10) Patent No.: US 10,418,638 B2
(45) Date of Patent: Sep. 17, 2019

(54) ELECTRODE WITH PERFORATED CURRENT COLLECTOR AND LITHIUM SECONDARY BATTERY INCLUDING THE SAME

(71) Applicant: LG CHEM, LTD., Seoul (KR)

(72) Inventor: Kyung Hwa Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 133 days.

(21) Appl. No.: 15/649,818

(22) Filed: Jul. 14, 2017

(65) Prior Publication Data

US 2018/0019477 A1 Jan. 18, 2018

(30) Foreign Application Priority Data

Jul. 18, 2016 (KR) ................ 10-2016-0090626

(51) Int. Cl.
| | | |
|---|---|---|
| *H01M 4/74* | (2006.01) | |
| *H01M 4/36* | (2006.01) | |
| *H01M 4/62* | (2006.01) | |
| *H01M 4/66* | (2006.01) | |
| *H01M 4/80* | (2006.01) | |
| *H01M 10/04* | (2006.01) | |
| *H01M 10/0525* | (2010.01) | |

(52) U.S. Cl.
CPC .......... *H01M 4/742* (2013.01); *H01M 4/366* (2013.01); *H01M 4/622* (2013.01); *H01M 4/661* (2013.01); *H01M 4/667* (2013.01); *H01M 4/668* (2013.01); *H01M 4/808* (2013.01); *H01M 10/0413* (2013.01); *H01M 10/0525* (2013.01)

(58) Field of Classification Search
CPC ...... H01M 4/742; H01M 4/808; H01M 4/668; H01M 4/667; H01M 4/661; H01M 4/366; H01M 4/622; H01M 10/0413; H01M 10/0525
See application file for complete search history.

(56) References Cited

U.S. PATENT DOCUMENTS

| | | | | |
|---|---|---|---|---|
| 6,025,094 A | * | 2/2000 | Visco | ...... H01M 4/04 427/126.2 |
| 6,447,957 B1 | * | 9/2002 | Sakamoto | ...... H01M 4/74 429/233 |
| 6,451,481 B1 | | 9/2002 | Lee et al. | |

(Continued)

FOREIGN PATENT DOCUMENTS

| | | |
|---|---|---|
| EP | 2978052 A1 | 1/2016 |
| JP | 11-242956 A | 9/1999 |

(Continued)

OTHER PUBLICATIONS

Partial European Search Report, dated Sep. 14, 2017, for European Application No. 17181825.5.

*Primary Examiner* — Stephan J Essex
*Assistant Examiner* — Kwang Han
(74) *Attorney, Agent, or Firm* — Birch, Stewart, Kolasch & Birch, LLP (57) ABSTRACT

Disclosed are an electrode including a perforated current collector, and a lithium secondary battery including the same, and according to the present disclosure, precipitation and elimination reactions of lithium metal are induced inside a perforation of a negative electrode current collector, and therefore, volume expansion of a cell is suppressed and battery performance is enhanced therefrom.

14 Claims, 6 Drawing Sheets

(56) References Cited

U.S. PATENT DOCUMENTS

| | | |
|---|---|---|
| 2004/0058232 A1 | 3/2004 | Kim et al. |
| 2004/0161667 A1* | 8/2004 | Fukuzawa ............... H01M 2/08 |
| | | 429/210 |
| 2005/0089759 A1 | 4/2005 | Hwang et al. |
| 2005/0118507 A1 | 6/2005 | Guterman et al. |
| 2005/0266304 A1 | 12/2005 | Honda et al. |
| 2013/0260257 A1 | 10/2013 | Choi |
| 2015/0295246 A1 | 10/2015 | Son et al. |

FOREIGN PATENT DOCUMENTS

| | | |
|---|---|---|
| JP | 11-283676 A | 10/1999 |
| JP | 2011-134691 A | 7/2011 |
| KR | 10-2000-0066870 A | 11/2000 |
| KR | 10-2001-0084375 A | 9/2001 |
| KR | 10-2001-0095827 A | 11/2001 |
| KR | 10-2002-0059181 A | 7/2002 |
| KR | 10-2002-0091748 A | 12/2002 |
| KR | 10-2004-0026208 A | 3/2004 |
| KR | 10-2004-0046647 A | 6/2004 |
| KR | 10-2004-0095851 A | 11/2004 |
| KR | 10-2005-0030438 A | 3/2005 |
| KR | 10-2005-0038905 A | 4/2005 |
| KR | 10-2005-0052920 A | 6/2005 |
| KR | 10-0477736 B1 | 6/2005 |
| KR | 10-0528903 B1 | 11/2005 |
| KR | 10-2006-0102745 A | 9/2006 |
| KR | 10-0669338 B1 | 1/2007 |
| KR | 10-2007-0066942 A | 6/2007 |
| KR | 10-2007-0105725 A | 10/2007 |
| KR | 10-1422908 B1 | 7/2014 |
| KR | 10-2015-0030156 A | 3/2015 |
| KR | 10-1503572 B1 | 3/2015 |
| KR | 10-2016-0027365 A | 3/2016 |
| KR | 10-1623447 B1 | 5/2016 |
| KR | 10-2017-0034773 A | 3/2017 |

* cited by examiner

ELECTRODE WITH PERFORATED CURRENT COLLECTOR AND LITHIUM SECONDARY BATTERY INCLUDING THE SAME

This application claims the benefit of Korean Application No. 10-2016-0090626 filed on Jul. 18, 2016, all of which are herein incorporated by reference in their entirety.

FIELD OF THE INVENTION

The present disclosure relates to an electrode including a perforated current collector, and a lithium secondary battery including the same, and in particular, to a technology using a perforated current collector and inducing precipitation and elimination reactions of lithium dendrite in the perforated part of the current collector.

BACKGROUND OF THE INVENTION

Interests in energy storage technologies have been increasingly higher recently. As applications are expanded to energy of mobile phones, camcorders and notebook PCs, and furthermore, to electric vehicles, efforts on the research and development of electrochemical devices have been more and more materialized.

Electrochemical devices are fields receiving most attentions in such aspects and among these, development of secondary batteries capable of charge and discharge have been the focus of attention, and in developing such batteries, research and development on the design of new electrodes and batteries for enhancing capacity density and energy efficiency have been recently progressed.

Among currently used secondary batteries, lithium secondary batteries developed in early 1990s have received attentions with advantages of having high operating voltage and significantly higher energy density compared to conventional batteries such as Ni-MH, Ni—Cd and sulfuric acid-lead batteries using an aqueous liquid electrolyte.

A lithium secondary battery is generally formed by an electrode assembly including a positive electrode, a negative electrode and a separator provided between the positive electrode and the negative electrode being embedded in a battery case in a laminated or wound structure, and a non-aqueous liquid electrolyte being injected thereinto.

As for a lithium electrode as the negative electrode, lithium foil attached on a planar current collector is used. In this case, lithium formation and elimination are irregular when charged and discharged producing lithium dendrite, and this leads to continuous capacity decline.

In view of the above, studies introducing a polymer protective layer or inorganic solid protective layer to a lithium metal layer, increasing a salt concentration of a liquid electrolyte, or using proper additives have been progressed. However, effects of suppressing lithium dendrite resulted from such studies are insignificant. Accordingly, solving problems through modifying a form of a lithium metal negative electrode itself or modifying a battery structure may be an effective option.

PRIOR ART DOCUMENTS

Patent Documents

Korean Patent Application Laid-Open Publication No. 2015-0030156 "Lithium Electrode and Lithium Secondary Battery Including the Same"

SUMMARY OF THE INVENTION

As described above, lithium dendrite of a lithium secondary battery is precipitated on a surface of a negative electrode current collector and volume expansion of a cell is sometimes caused therefrom. In view of the above, the inventors of the present disclosure have conducted studies from various angles and, as a result, have found out a method of solving such a problem caused by dendrite through modifying shape and structure of an electrode itself, and have completed the present disclosure.

Accordingly, the present disclosure is directed to providing a lithium secondary battery solving a problem of volume expansion of a cell caused by lithium dendrite through modifying shape and structure of an electrode, and having enhanced performance.

In view of the above, one embodiment of the present disclosure provides an electrode for a lithium secondary battery including a pair of negative electrode current collectors having a plurality of perforations and a lithium metal layer disposed between the pair of negative electrode current collectors. The electrode may further include an insulation layer disposed on the negative electrode current collector, and having a plurality of perforations funneled to the perforations.

Another embodiment of the present disclosure provides a lithium secondary battery including the electrode.

100. Negative Electrode Current Collector
110. Perforation
200. Lithium Metal Layer
300. Insulation Layer

DETAILED DESCRIPTION OF THE EMBODIMENTS

Hereinafter, embodiments of the present disclosure will be described in detail with reference to the accompanying drawings so that those skilled in the art may readily implement the present disclosure. However, the present disclosure may be implemented in various different forms, and is not limited to the embodiments described herein.

In the drawings, parts not relevant to the descriptions are not included in order to clearly describe the present disclosure, and like reference numerals are used for like elements throughout the specification. In addition, sizes and relative sizes of constituents shown in the drawings are unrelated to actual scales, and may be reduced or exaggerated for clarity of the descriptions.

Figure 1:
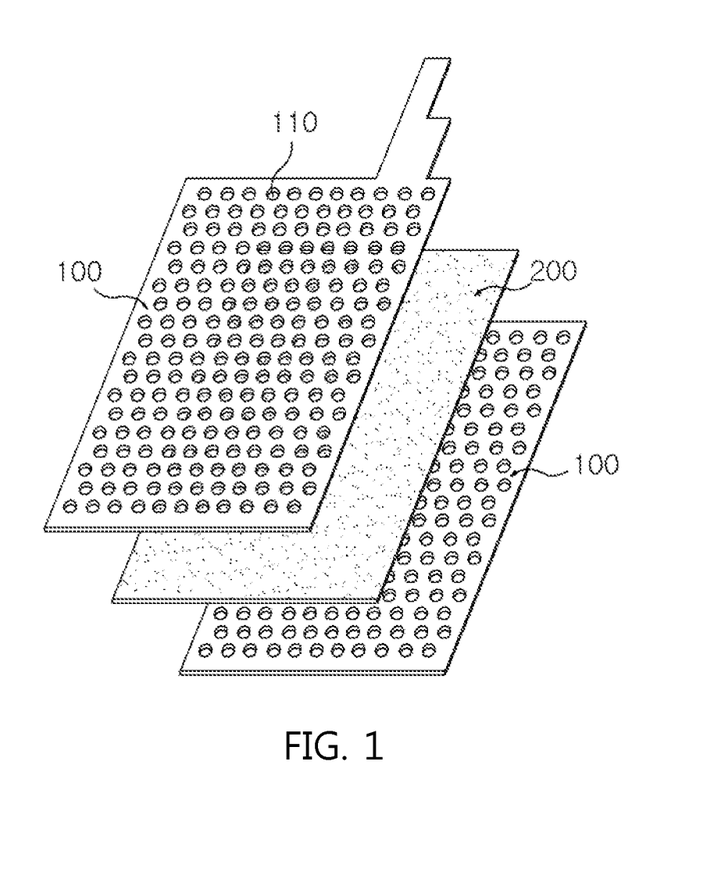
FIG. 1 is a perspective view of an electrode for a lithium secondary battery including a perforated negative electrode current collector according to the present disclosure.

FIG. 1 illustrates a perspective view and a perspective view of an essential part of an electrode for a lithium secondary battery including a perforated current collector according to the present disclosure. A first embodiment of the present disclosure provides an electrode for a lithium secondary battery including a pair of negative electrode current collectors (100) having a plurality of perforations (110) and a lithium metal layer (200) disposed between the pair of negative electrode current collectors (100).

According to the present disclosure, by using a perforated negative electrode current collector (100), precipitation and elimination reactions of lithium dendrite are induced to occur inside the perforation (110) of the negative electrode current collector (100), and volume expansion of a cell may be suppressed therefrom.

Figure 2:
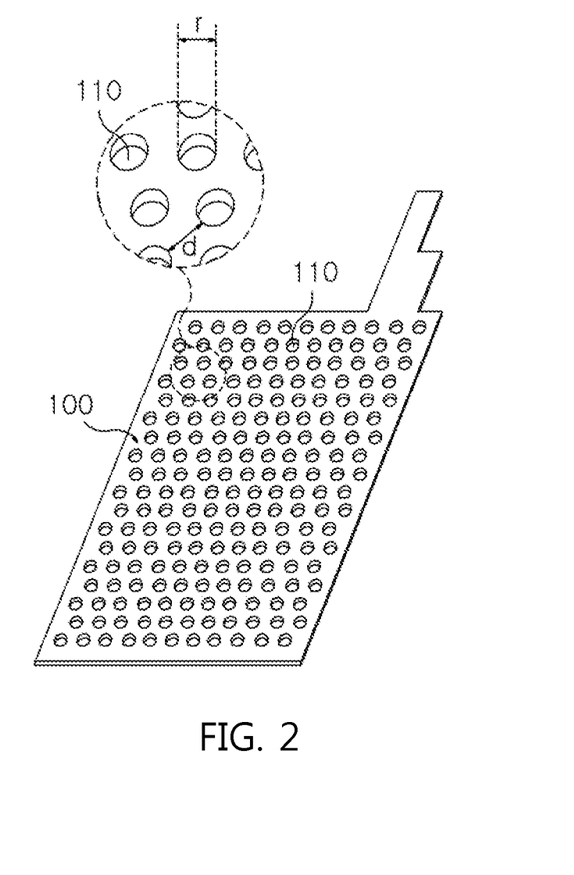
FIG. 2 illustrates a perspective view and an enlarged view of an essential portion of a perforated negative electrode current collector according to the present disclosure.

FIG. 2 illustrates a perspective view and an enlarged view of an essential part of a perforated negative electrode current collector according to the present disclosure. The perforation (110) formed on the negative electrode current collector (100) is not limited in the shape, and for example, may have a circular, oval or polygonal shape. In a circular perforation as illustrated in FIG. 2, having a diameter (r) from 0.1 mm to 1.0 mm and space (d) between perforations from 0.1 nm to 1.0 mm is preferred in securing an effect of inducing lithium dendrite precipitation and elimination reactions inside the perforation (110), a goal of the present disclosure. In addition, in a polygonal perforation, a perforation, having a longest distance of a perforation inner side surface from 0.1 mm to 1.0 mm, and space (d) between perforations from 0.1 mm to 1.0 mm is preferred.

In addition, as for a ratio of the perforation (110) in the negative electrode current collector (100), an aperture ratio, an area ratio of the perforation region based on the total area 100% of the negative electrode current collector, is preferably from 20% to 80%. When the aperture ratio is less than 20%, the effect of inducing precipitation and elimination reactions of lithium dendrite, a goal of the present disclosure, may not be secured, and when the aperture ratio is greater than 80%, the area of contact between the negative electrode current collector and the lithium metal layer relatively decreases, which is not proper in performing a role as a negative electrode current collector, and as a result, battery performance declines.

The negative electrode current collector (100) according to the present disclosure is not particularly limited as long as it has high conductivity without inducing chemical changes in a battery, and may be any one metal selected from the group consisting of copper, aluminum, stainless steel, zinc, titanium, silver, palladium, nickel, iron, chromium, alloys thereof and combinations thereof. The stainless steel may have its surface treated with carbon, nickel, titanium or silver, and aluminum-cadmium alloys may be used as the alloy, and in addition thereto, baked carbon, nonconductive polymers of which surface is treated with a conductor, conductive polymers or the like may also be used. As the negative electrode current collector, a copper thin plate is generally used.

As the negative electrode current collector (100), those having a thickness range of 3 μm to 500 μm are generally used. When the negative electrode current collector has a thickness of less than 3 μm, a current collecting effect decreases, and perforations (110) having a sufficient size to collect lithium dendrite are not secured. Meanwhile, the thickness being greater than 500 μm has a problem of reducing processability when assembling a cell through folding.

The negative electrode current collector (100) may be perforated after being laminated on a lithium metal layer (200), or a perforated negative electrode current collector (100) may be laminated on a lithium metal layer (200).

As the perforated negative electrode current collector (100), metal mesh, metal foam, perforated metal foil or expanded metal foil may be used as an example. Among these, the expanded metal foil has a thickness of 40 μm, has a perforation size of 0.3 mm, and is provided with a specification of the aperture ratio being 50%, and therefore, is preferably used as the negative electrode current collector (100) of the present disclosure.

In addition, the lithium metal layer (200) includes lithium, and may be a lithium-containing metal compound selected from the group consisting of S, P, O, Cl, Se, F, Br, I and combinations thereof. In addition thereto, elements selected from the group consisting of Ni, Co, Cu, Zn, Ga, Ge, Si, Al, Fe, V, Mn, Ti, Mo, Cr, Nb, Pt and combinations thereof may be further included.

In the lithium-containing metal compound, an added sum of the rest of the elements other than lithium is preferably approximately from 5% by weight to 20% by weight with respect to the total negative electrode active material weight when combined. The type of combination is not limited, and for example, alloying in the corresponding mixing ratio may be used, or forming a film on the negative electrode current collector may in the form of metal powders also be used.

Such a lithium-containing metal compound is added for compensating irreversible capacity of lithium metal, and may be added in an amount corresponding to theoretical capacity of a positive electrode active material to be described below or added in an excess amount thereto, and such an excess negative electrode active material may prevent lithium dendrite from being precipitated on the lithium metal surface.

Figure 3:
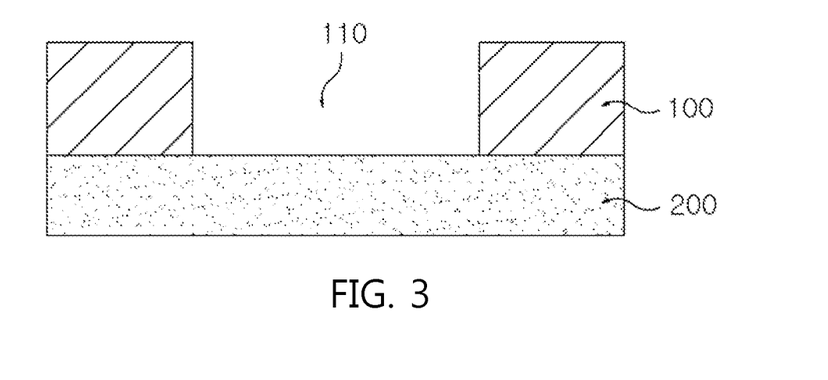
FIG. 3 is a cross-sectional view of an electrode for a lithium secondary battery including a perforated negative electrode current collector according to a first embodiment of the present disclosure.

FIG. 3 is a cross-sectional view of an electrode for a lithium secondary battery including a perforated negative electrode current collector according to a first embodiment of the present disclosure. As described above, a pair of negative electrode current collectors (100) having perforations (110) and a lithium metal layer (200) disposed between the pair of negative electrode current collectors (100) are included, and precipitation and elimination reactions of lithium dendrite are induced in the perforations (110).

Figure 4:
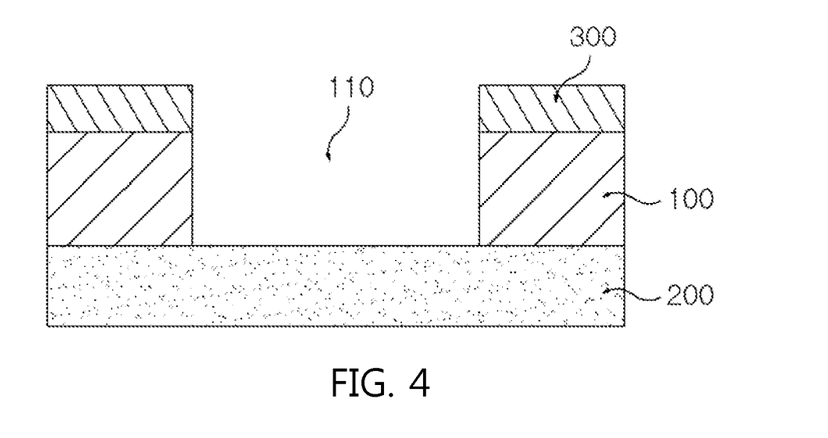
FIG. 4 is a cross-sectional view of an electrode for a lithium secondary battery including a perforated negative electrode current collector and an insulation layer according to a second embodiment of the present disclosure.

FIG. 4 is a cross-sectional view of an electrode for a lithium secondary battery including a perforated negative electrode current collector and an insulation layer according to a second embodiment of the present disclosure. The electrode for a lithium secondary battery according to the present disclosure includes, as illustrated in FIG. 4, the negative electrode current collector (100) described above and a lithium metal layer (200), and additionally, further includes an insulation layer (300) disposed on the negative electrode current collector (100), and having a plurality of perforations funneled to the perforations (110).

The plurality of perforations formed on the insulation layer (300) are preferably funneled and formed so that the shape, the diameter (r) and the space (d) are identical to the plurality of perforations (110) formed on the negative electrode current collector (100). Such an insulation layer (300) prevents precipitation and elimination reactions of lithium dendrite from occurring on the negative electrode current collector (100), and performs a role of further inducing precipitation and elimination reactions of lithium dendrite only on the perforations (110) formed on the negative electrode current collector (100).

The insulation layer (300) is preferably formed with insulating materials that do not have electron conductivity and lithium ion conductivity, and for example, may be selected from among styrene-butadiene series rubber, carboxymethylcellulose, polytetrafluoroethylene, polyethylene, polypropylene, an ethylene propylene copolymer, polybutadiene, butyl rubber, fluoro rubber, polyethylene oxide, polyvinyl pyrrolidone, polyepichlorohydrin, polyphosphazene, polyacrylonitrile, polystyrene, an ethylene propylene diene copolymer, polyvinyl pyridine, chlorosulfonated polyethylene, latex, a polyester resin, an acrylic resin, a phenol resin, an epoxy resin, polyvinyl alcohol, hydroxypropylcellulose and combinations thereof, but is not limited thereto.

As for the thickness of the insulation layer (300), having a lower thickness is advantageous for output properties of a battery, however, the precipitation and elimination reactions of lithium dendrite may be suppressed on the negative electrode current collector (100) when the insulation layer is formed to have a certain thickness or higher. When considering the significance of an improvement effect obtained by the insulation layer formation, the thickness is preferably from 0.01 µm to 50 µm.

A method for preparing the electrode for a lithium secondary battery according to the present disclosure may be carried out in various ways, and may be carried out according to the following embodiments.

According to one embodiment, a negative electrode current collector is prepared first. When necessary, an insulation layer is laminated on one surface of the negative electrode current collector. The (insulation layer-formed) negative electrode current collector is perforated. The perforated (insulation layer-formed) negative electrode current collector is laminated on a lithium metal layer.

According to another embodiment, a lithium metal layer is prepared first. On at least one surface of the lithium metal layer, a common negative electrode current collector is laminated. After that, an insulation layer is laminated on the negative electrode current collector as necessary. The negative electrode current collector (and the insulation layer) is perforated so that the lithium metal layer is exposed.

According to still another embodiment, a perforated negative electrode current collector is prepared first. After that, an insulation layer is formed only on an upper surface of the perforated negative electrode current collector as necessary. The perforated (insulation layer-formed) negative electrode current collector is laminated on a lithium metal layer.

As for a lithium secondary battery according to the present disclosure, constitutions other than the structure and the properties of the negative electrode described above may be prepared through known technologies implemented by those skilled in the art, and will be specifically described below.

A positive electrode according to the present disclosure may be prepared into a positive electrode form by forming film on a positive electrode current collector using a composition including a positive electrode active material, a conductor and a binder.

As the positive electrode active material, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}CoyO_2$, $LiCo_{1-y}MnyO_2$, $LiNi_{1-y}MnyO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more types thereof may be used. In addition, sulfides, selenides, halides and the like may also be used in addition to such oxides. In more preferred examples, the positive electrode active material may be $LiCoO_2$ suitable for a high power battery.

The conductor is a component for further enhancing conductivity of a positive electrode active material, and nonlimiting examples thereof may include graphite such as natural graphite or artificial graphite; carbon black such as carbon black, acetylene black, Ketjen black, channel black, furnace black, lamp black and thermal black; conductive polymers such as carbon fiber or metal fiber; metal powders such as fluorocarbon, aluminum and nickel powder; conductive whiskers such as zinc oxide and potassium titanate; conductive metal oxides such as titanium oxide; conductive materials such as polyphenylene derivatives, and the like.

The binder has functions of keeping a positive electrode active material on a positive electrode current collector, and organically linking the positive electrode active materials, and examples thereof may include polyvinylidene fluoride (PVDF), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

A separator according to the present disclosure is not particularly limited in the material and, as a material physically separating a positive electrode and a negative electrode, and having electrolyte and ion penetrability, those commonly used as a separator in an electrochemical device may be used without particular limit. However, as a material that is porous, nonconductive and insulating, those having an excellent liquid electrolyte moisture-containing ability while having low resistance for ion migration of the liquid electrolyte are particularly preferred. For example, a polyolefin-based porous membrane or non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or a polymer mixing these may be used.

As the non-woven fabric other than the polyolefin-based non-woven fabric described above, non-woven fabric formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyether ether ketone, polyester and the like alone, or a polymer mixing these may be used, and, as a fiber form forming a porous web, such non-woven fabric includes a spunbond or meltblown form formed with long fibers.

The thickness of the separator is not particularly limited, but is preferably in a range of 1 µm to 100 µm, and more preferably in a range of 5 µm to 50 µm. When the separator has a thickness of less than 1 µm, mechanical properties may not be maintained, and when the thickness is greater than 100 μm, the separator functions as a resistive layer declining battery performance.

A pore size and porosity of the separator are not particularly limited, however, the pore size is preferably from 0.1 μm to 50 μm, and the porosity is preferably from 10% to 95%. When the separator has a pore size of less than 0.1 μm or porosity of less than 10%, the separator functions as a resistive layer, and when the pore size is greater than 50 μm or the porosity is greater than 95%, mechanical properties may not be maintained.

An electrolyte capable of being used in the present disclosure may be a non-aqueous liquid electrolyte or a solid electrolyte not reacting with lithium metal, but is preferably a non-aqueous electrolyte, and includes an electrolyte salt and an organic solvent.

The electrolyte salt included in the non-aqueous liquid electrolyte is a lithium salt. As the lithium salt, those commonly used in liquid electrolytes for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone, or as a mixture of two or more types. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a high viscosity organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, a liquid electrolyte having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous liquid electrolyte may be injected at a proper stage in an electrochemical device manufacturing process depending on a final product manufacturing process and required properties. In other words, the non-aqueous liquid electrolyte may be injected at a stage prior to assembling an electrochemical device or at a final stage of electrochemical device assembly.

The lithium secondary battery according to the present disclosure may go through lamination (stack) and folding processes of a separator and an electrode in addition to winding, a general process. In addition, the battery case may be cylindrical, square, a pouch-type, a coin-type or the like.

As above, the lithium secondary battery according to the present disclosure stably exhibits excellent discharge capacity, output property and capacity retention rate, and therefore, is useful in the fields of portable devices such as mobile phones, notebook computers or digital cameras, electric vehicles such as hybrid electric vehicles (HEV), and the like.

Accordingly, another embodiment of the present disclosure provides a battery module including the lithium secondary battery as a unit cell, and a battery pack including the same. The battery module or the battery pack may be used as a power supply of any one or more of medium to large sized devices among power tools; electric vehicles including electric vehicles (EV), hybrid electric vehicles and plug-in hybrid electric vehicles (PHEV); or systems for power storage.

Hereinafter, the present disclosure will be described in detail with reference to examples. However, examples according to the present disclosure may be modified to various different forms, and the scope of the present disclosure is not to be construed as being limited to the examples described below. The examples of the present disclosure are provided to those having average knowledge in the art in order to more completely describe the present disclosure.

Example 1

Figure 5:
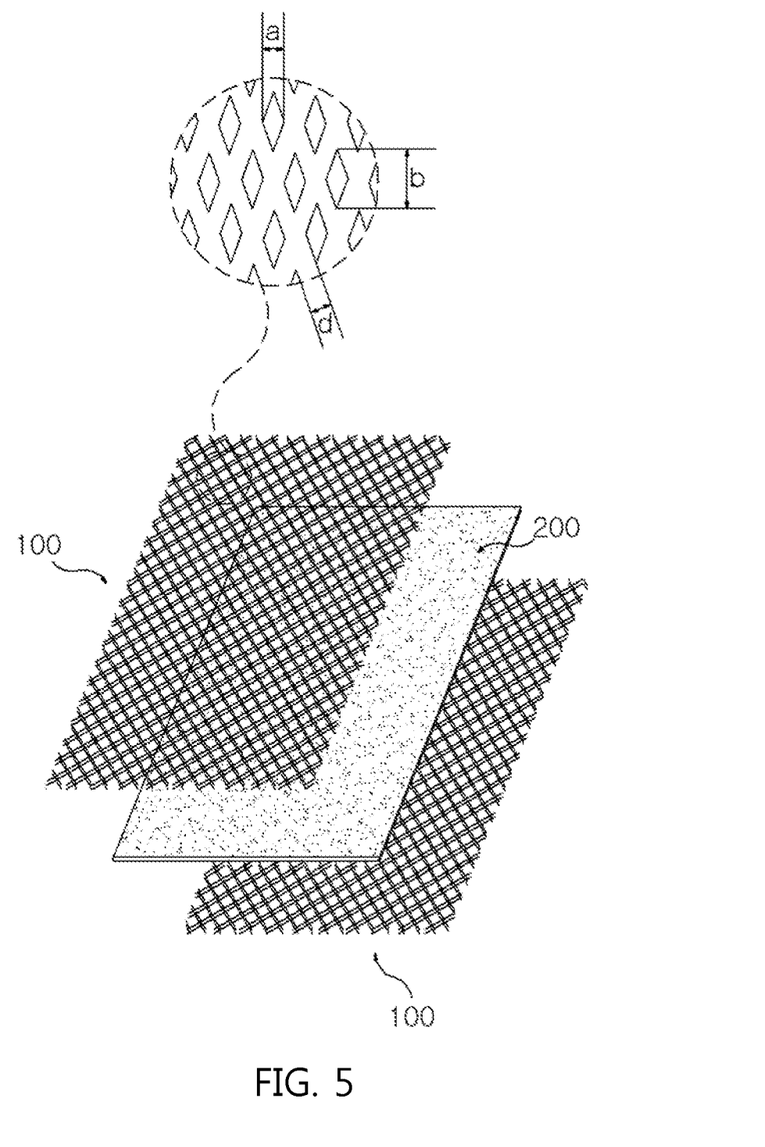
FIG. 5 is a perspective view illustrating a structure of an electrode according to Example 1 of the present disclosure.

Referring to an electrode structure illustrated in FIG. 5, two sheets of copper meshes (100) having rhombus-shaped perforations and a thickness of 25 μm were prepared first. Herein, the shortest distance (a) inside the perforation was 0.5 mm, the longest distance (b) was 1.0 mm, and space (d) between the perforations was 0.5 mm. Between such two layers of copper meshes (100), lithium foil (200) having a thickness of 40 μm was attached to prepare a negative electrode.

Example 2

After preparing two sheets of copper meshes (100) identical to Example 1, styrene-butadiene rubber (SBR) was coated to a thickness of 1 μm on one surface, and lithium foil (200) was attached on a surface opposite to the coated surface to prepare a negative electrode in the same structure as in Example 1, an electrode structure illustrated in FIG. 5.

Comparative Example 1

Figure 6:
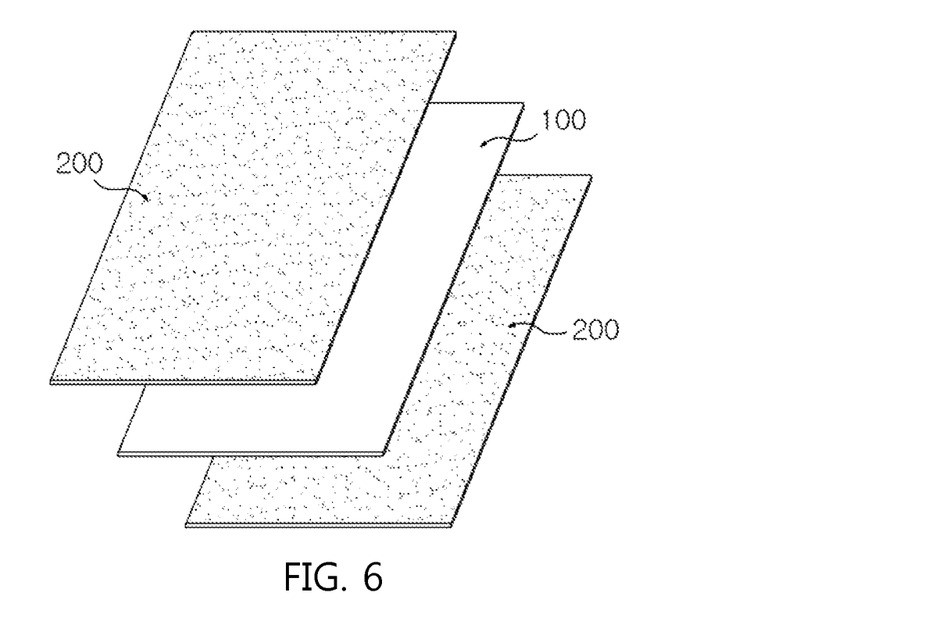
FIG. 6 is a perspective view illustrating a structure of an electrode according to Comparative Example 1 of the present disclosure.

Referring to an electrode structure illustrated in FIG. 6, two sheets of lithium foil (200) having a thickness of 20 μm were attached on both surfaces of copper foil (100) having a thickness of 20 μm to prepare a negative electrode.

Comparative Example 2

Figure 7:
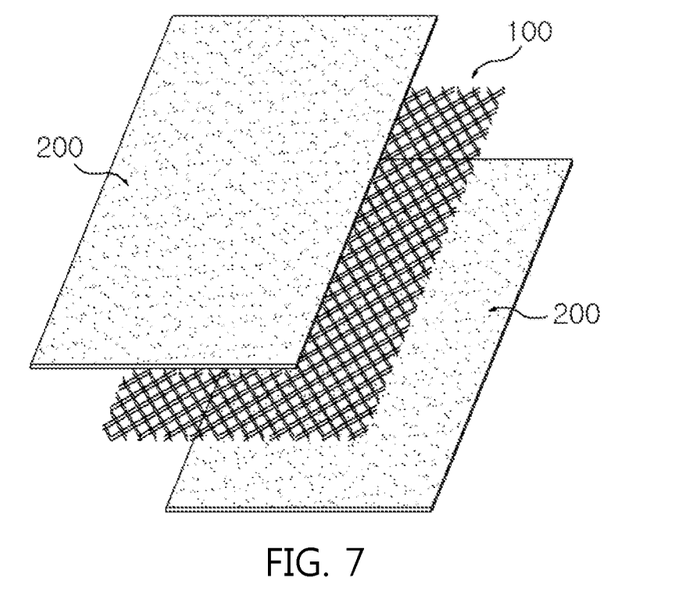
FIG. 7 is a perspective view illustrating a structure of an electrode according to Comparative Example 2 of the present disclosure.

Referring to an electrode structure illustrated in FIG. 7, two sheets of lithium foil (200) having a thickness of 20 μm were attached on both surfaces of copper mesh (100) having a thickness of 20 μm to prepare a negative electrode.

Test Example 1

With the negative electrodes of Examples 1 and 2 and Comparative Examples 1 and 2, NMC positive electrode active material:conductor:PVDF binder were mixed in 97:1:2 and the result was formed as a film on aluminum foil having a thickness of 10 μm as a positive electrode. As a separator, a material coating SRS to a thickness of 5 μm on both surfaces of PE material having a thickness of 7 μm was used. As a liquid electrolyte, EC 30% v/v, EMC 70% v/v LiPF$_6$ 1M VC 0.5% were used. The prepared separator and the positive electrode were consecutively attached, and the liquid electrolyte was injected thereto to manufacture a lithium secondary battery having a bicell structure.

For the lithium secondary batteries manufactured in Examples 1 and 2 and Comparative Examples 1 and 2, charge and discharge were carried out by repeating 50 cycles at a constant current of 20 mAh, and a thickness increase rate was measured by measuring a cell thickness at SOC100 (completely charged state) and comparing the thickness with an initial cell thickness. In addition, the number of cycles completing the charge and discharge was measured. The measurement results are summarized in the following Table 1.

TABLE 1

| Test Item | Example 1 | Example 2 | Comparative Example 1 | Comparative Example 2 |
|---|---|---|---|---|
| SOC 100 Increase in Cell Thickness (%) | 130% | 120% | 180% | 170% |
| Number of Completed Cycle | 150 | 110 | 90 | 100 |

When examining Table 1, it was identified that the thickness increase rate in the lithium secondary batteries of Examples 1 and 2 using copper mesh as a negative electrode current collector was significantly reduced compared to Comparative Examples 1 and 2. As for the number of cycles completing the charge and discharge, the lifespan of the lithium secondary battery of Example 1 using copper mesh as a negative electrode current collector was extended by approximately 1.67 times compared to the lifespan of the battery of Comparative Example 1 using copper foil as a negative electrode current collector. In addition, in the lithium secondary battery of Example 2 coating one surface of copper mesh with an SBR insulation layer, an effect of reducing cell expansion rate was enhanced compared to the lithium secondary battery of Example 1 without an insulation layer, and performance somewhat declined in lifespan properties, and this is considered to be due to the fact that the insulation layer functioned as resistance. Meanwhile, in Comparative Example 2 using lithium foil on both surfaces of copper mesh, notable effects were not obtained in terms of cell expansion rate reducing effect or lifespan properties, and it was identified that the structure using copper mesh on both surfaces of lithium metal was important in enhancing cell performance.

The lithium secondary battery using the electrode according to the present disclosure induces precipitation and elimination reactions of lithium metal inside perforations of a negative electrode current collector, and therefore, volume expansion of the cell is suppressed, and battery performance is enhanced therefrom.

What is claimed is:

1. An electrode for a lithium secondary battery comprising:
    a pair of negative electrode current collectors having a plurality of perforations; and
    a lithium metal layer disposed between the pair of negative electrode current collectors,
    wherein the lithium metal layer comprises a first surface and a second surface opposite the first surface, the first surface directly contacting a surface of a first negative electrode current collector of the pair of negative electrode current collectors and the second surface directly contacting a surface of a second negative current collector of the pair of negative current collectors.

2. The electrode for a lithium secondary battery of claim 1, further comprising an insulation layer disposed on the negative electrode current collector and having a plurality of perforations funneled to the perforations.

3. The electrode for a lithium secondary battery of claim 1, wherein the perforation has a circular, oval or polygonal shape.

4. The electrode for a lithium secondary battery of claim 1, wherein an aperture ratio caused by the perforations of the negative electrode current collector is from 20% to 80%.

5. The electrode for a lithium secondary battery of claim 1, wherein the perforation of the negative electrode current collector is a circle having a diameter from 0.1 mm to 1.0 mm.

6. The electrode for a lithium secondary battery of claim 1, wherein the perforation of the negative electrode current collector is a polygon having a longest distance of an inner side surface from 0.1 mm to 1.0 mm.

7. The electrode for a lithium secondary battery of claim 1, wherein space between the perforations of the negative electrode current collector is from 0.1 mm to 1.0 mm.

8. The electrode for a lithium secondary battery of claim 1, wherein the negative electrode current collector is selected from the group consisting of copper, aluminum, stainless steel, zinc, titanium, silver, palladium, nickel, iron, chromium, an alloy thereof and a combination thereof.

9. The electrode for a lithium secondary battery of claim 1, wherein a thickness of the negative electrode current collector is from 3 μm to 500 μm.

10. The electrode for a lithium secondary battery of claim 2, wherein the insulation layer is one or more types selected from among styrene-butadiene series rubber, carboxymethylcellulose, polytetrafluoroethylene, polyethylene, polypropylene, an ethylene propylene copolymer, polybutadiene, butyl rubber, fluoro rubber, polyethylene oxide, polyvinyl pyrrolidone, polyepichlorohydrin, polyphosphazene, polyacrylonitrile, polystyrene, an ethylene propylene diene copolymer, polyvinyl pyridine, chlorosulfonated polyethylene, latex, a polyester resin, an acrylic resin, a phenol resin, an epoxy resin, polyvinyl alcohol, hydroxypropylcellulose and a combination thereof.

11. The electrode for a lithium secondary battery of claim 2, wherein a thickness of the insulation layer is from 0.01 μm to 50 μm.

12. A lithium secondary battery comprising:
a negative electrode;
a positive electrode;
a separator provided therebetween; and
an electrolyte,
wherein the negative electrode is the electrode of claim 1.

13. The electrode for a lithium secondary battery of claim 1, wherein the lithium metal layer includes Li; and a lithium-containing metal compound selected from the group consisting of S, P, O, Cl, Se, F, Br, I and a combination thereof.

14. The electrode for a lithium secondary battery of claim 13, wherein the lithium metal layer further includes an element selected from the group consisting of Ni, Co, Cu, Zn, Ga, Ge, Si, Al, Fe, V, Mn, Ti, Mo, Cr, Nb, Pt and a combination thereof.

* * * * *